US 6,636,333 B1

(12) United States Patent
Hatamura et al.

(10) Patent No.: US 6,636,333 B1
(45) Date of Patent: Oct. 21, 2003

(54) INFORMATION TRANSMISSION DEVICE

(75) Inventors: Junji Hatamura, Nagoya (JP); Kenichi Dan, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/277,374

(22) Filed: Mar. 29, 1999

(30) Foreign Application Priority Data

Mar. 30, 1998 (JP) ............................................. 10-103784
Mar. 30, 1998 (JP) ............................................. 10-103954

(51) Int. Cl.[7] .................................................. H04N 1/00
(52) U.S. Cl. ................... 358/434; 358/407; 379/100.01
(58) Field of Search .................................. 358/400, 403, 358/404, 407, 434, 438, 440, 442, 444, 468; 379/100.01, 100.09

(56) References Cited

U.S. PATENT DOCUMENTS

| 4,340,783 A | 7/1982 | Sugiyama et al. | |
| 5,068,888 A | 11/1991 | Scherk et al. | ............... 358/403 |
| 5,090,049 A | 2/1992 | Chen | ..................... 379/100.09 |
| 5,224,156 A | 6/1993 | Fuller et al. | ................. 358/407 |
| 5,270,833 A | * 12/1993 | Kubokawa et al. | ......... 358/434 |
| 5,870,549 A | * 2/1999 | Bobo | .......................... 358/400 |
| 5,872,637 A | * 2/1999 | Nakanishi | .................... 358/403 |

FOREIGN PATENT DOCUMENTS

| EP | 0 371 726 | 6/1990 |
| GB | 2 320 848 A | 1/1998 |
| JP | A 11-69033 | 3/1999 |

* cited by examiner

Primary Examiner—Mark Wallerson
(74) Attorney, Agent, or Firm—Oliff & Berridge PLC

(57) ABSTRACT

A remote facsimile machine 61 calls a facsimile device 1 in S10 so that the facsimile machine 1 connects the telephone circuit in S32. When the remote facsimile machine 61 detects circuit connection in S12, the remote facsimile machine 61 transmits in S14 a transmission request signals and a facsimile number of the subject remote facsimile machine 61 to the facsimile device 1. The facsimile device 1 receives in S34 the transmission request signal and the remote facsimile number. The facsimile device 1 calls in S50 the remote facsimile machine 61 based on the remote facsimile number received in S34, and transmits stored image information to the remote facsimile machine 61.

15 Claims, 7 Drawing Sheets

INFORMATION TRANSMISSION DEVICE

BACKGROUND OF THE INVENTION

1. Field of the Invention

The present invention relates to an information transmission device such as a facsimile machine that is capable of transmitting information to remote devices.

2. Description of Related Art

U.S. Pat. No. 5,270,833 has proposed a facsimile machine that can transfer incoming facsimile data to a remote facsimile machine in response to a transfer request transmitted from the remote facsimile machine.

SUMMARY OF THE INVENTION

It is conceivable to design the facsimile machine so that the facsimile machine can be registered with a facsimile number of a remote facsimile machine. This facsimile machine is designed to store incoming facsimile data, to respond to a transfer request from the remote facsimile machine, and then to transfer the stored incoming facsimile data to the remote facsimile machine.

A user can use this type of facsimile machine in a manner described below.

While a user is outside his/her own home or office where his/her facsimile machine is located, the facsimile machine is controlled to store incoming facsimile data. The user can access his/her facsimile machine from the remote facsimile machine that is located where the user is presently staying and whose facsimile number is registered in the user's facsimile machine. That is, the user operates the remote facsimile machine to request his/her own facsimile machine to transfer, to that remote facsimile machine, incoming facsimile data that is presently being stored in the user's facsimile machine. Upon receipt of this transfer request, the user's facsimile machine transfers the stored information to the remote device.

This type of facsimile machine is designed to transfer incoming facsimile data only to the remote facsimile machine whose facsimile number is registered in the subject facsimile machine. The facsimile machine, therefore, may not transfer incoming facsimile data to any other remote facsimile machines whose facsimile numbers are not registered in the subject facsimile machine. Accordingly, when the user leaves his/her office or home without knowing exactly where he or she is going, then the user can not register facsimile numbers of any remote facsimile machines in his/her facsimile machine. Accordingly, while the user is outside his/her home or office, the user can not remotely control his/her own facsimile machine to transfer facsimile data to his/her location.

It is therefore an objective of the present invention to provide an improved information transmission device that is capable of transmitting incoming information to any remote device, such as a facsimile device, in response to a transmission request, even when a facsimile number or other information identifying the remote device is not registered.

In order to attain the above and other objects, the present invention provides an information transmission device, comprising: means for storing information; means for detecting data specifying a remote target device, to which the information is desired to be transmitted; and means for transmitting the information to the remote target device based on the remote target device specifying data.

The detecting means may include: call detecting means for detecting a call from a remote requesting device and for establishing a connection with the remote requesting device; and request detecting means for detecting the remote target device specifying data transmitted from the remote requesting device through the established connection.

The request detecting means may include means for disconnecting the connection with the remote requesting device after the remote target device specifying data is detected. The transmitting means may include means for transmitting a call signal for calling the remote target device so that a connection will be established with the remote target device, the information being transmitted to the remote target device through the established connection.

According to another aspect, the present invention provides an information transmission device, comprising: means for storing information; means for receiving, through a telephone circuit connected to a remote requesting device, a transmission request signal for requesting transmission of the information and data specifying a remote target device, to which the information is desired to be transmitted; means for storing the received remote target device specifying data; control means for, after reception of the transmission request signal and the remote target device specifying data, disconnecting the telephone circuit presently connected to the remote requesting device, and thereafter calling the remote target device based on the remote target device specifying data; and means for transmitting the information to the remote target device via a telephone circuit connected by the control means.

The remote target device may be the same as the remote requesting device. The remote target device may be different from the remote requesting device.

According to a further aspect, the present invention provides an information supplying system, comprising: a terminal, including: means for designating a target terminal, to which information is desired to be transmitted; and means for transmitting data specifying the target terminal to an information supplying device and for requesting the information supplying device to transmit the information to target terminal, and the information supplying device, including means for storing the information; means for receiving the target terminal specifying data; and means for transmitting the information to the target terminal based on the remote target terminal specifying data.

According to still another aspect, the present invention provides a data storage medium storing data of a computer program for controlling an information transmission device to transmit information, stored in the information transmission device, to a remote target device, the computer program comprising: a computer program of detecting data specifying a remote target device, to which information is desired to be transmitted; and a computer program of transmitting the information to the remote target device based on the remote target device specifying data.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 1:
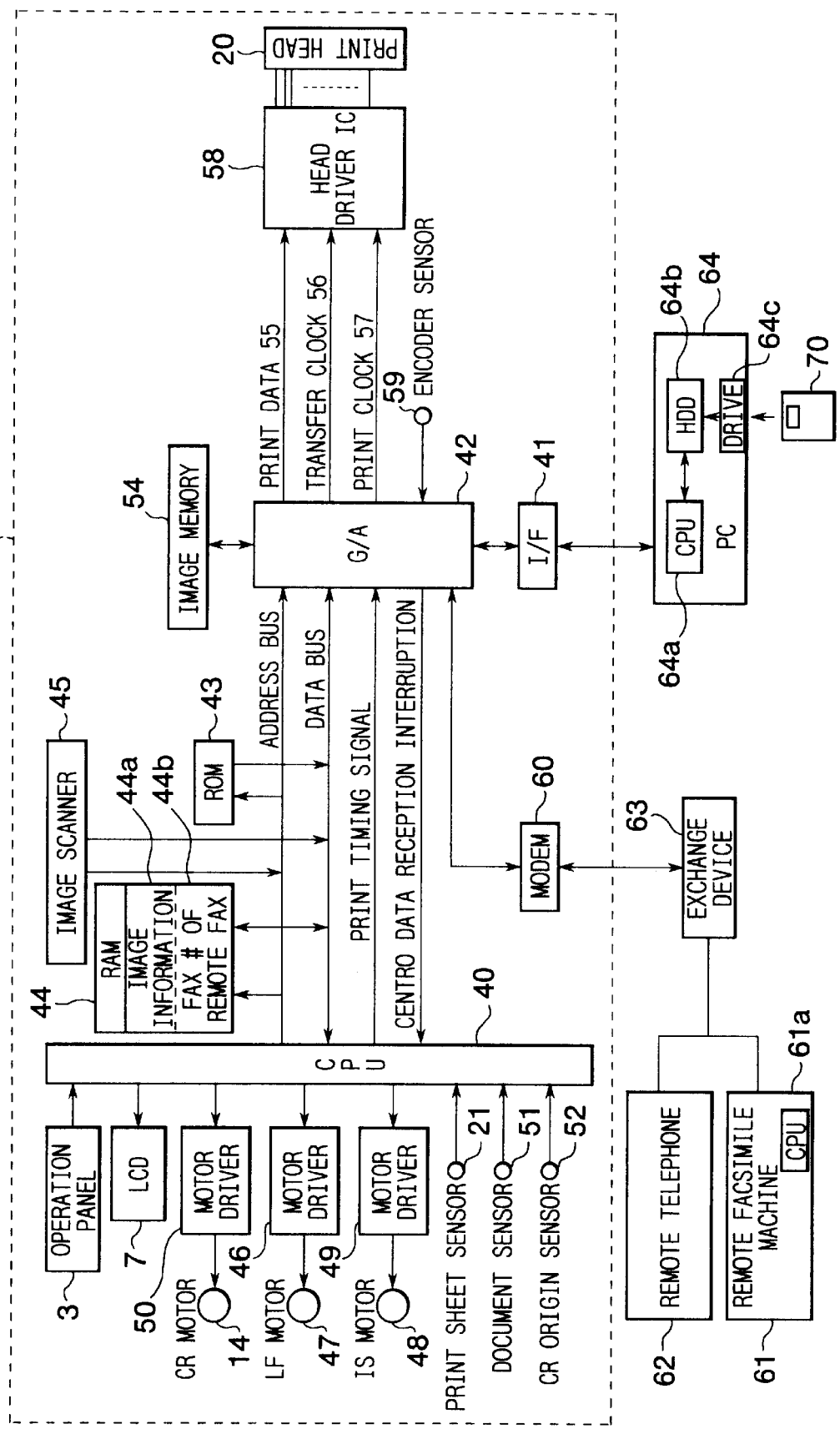
FIG. 1 is a block diagram showing a main control system of a facsimile device 1 according to an embodiment of the present invention.

An information transmission device according to preferred embodiments of the present invention will be described while referring to the accompanying drawings wherein like parts and components are designated by the same reference numerals to avoid duplicating description.

First Embodiment

An information transmission device of a first embodiment of the present invention will be described below with reference to FIGS. 1–4.

The information transmission device 1 of the present embodiment is a facsimile machine.

As shown in FIG. 1, the facsimile machine 1 is connected via a telephone circuit to an exchange device or switchboard 63. Many remote devices can be connected to the exchange device 63 via the telephone circuit. FIG. 1 shows, as an example of the remote devices, a remote telephone 62 and a remote facsimile machine 61 that can be connected to the exchange device 63 via the telephone circuit.

The facsimile machine 1 is also connected to a personal computer 64 via an interface (I/F) 41. The facsimile machine 1 can receive, from the personal computer 64, print data desired to be printed by the facsimile machine 1.

As shown in FIG. 1, the facsimile device 1 includes: a recording head 20, an image scanner 45, a communication modem 60, and a gate array 42. The recording head 20 is for recording incoming facsimile data received from the telephone circuit and print data inputted from the personal computer 64. The image scanner 45 is for scanning a document mounted thereon to produce outgoing facsimile data. The communication modem 60 is for modulating the outgoing facsimile data and transmitting the modulated data to the telephone circuit and for receiving incoming facsimile data from the telephone circuit and demodulating the received data. The gate array 42 is for developing incoming facsimile data received and demodulated by the communication modem 60 and for developing print data inputted from the personal computer 64 via the interface 41.

The facsimile machine 1 includes a CPU 40 for controlling the entire facsimile machine 1 by performing a variety of different controls, such as a transmission control for controlling the modem 60 to transmit outgoing facsimile data, a reception control for controlling the modem 60 to receive incoming facsimile data, a retrieval control for retrieving image information from a document using the image scanner 45, a recording control for recording incoming facsimile data and print data onto a recording sheet using the recording head 20, an input/output control for inputting and outputting data from and to the personal computer 64, and a facsimile transfer control of the present embodiment for transferring incoming facsimile data to a remote facsimile machine 61, for example, in response to a transfer request received from the remote facsimile machine 61.

The CPU 40 and the gate array 42 are connected by an address bus and a data bus. A ROM 43 and a RAM 44 are connected to the address bus and the data bus. The ROM 43 stores therein control programs to be executed by the CPU 40 to perform the above-described variety of controls. For example, the ROM 43 stores therein a facsimile transfer control program whose flowchart is shown in the right side of FIG. 4. The ROM 43 also stores therein a transfer request control program whose flowchart is shown in the left side of FIG. 4. In order to allow the CPU 40 to execute the various control programs, the control programs are first retrieved from the ROM 43 and are temporarily stored in the RAM 43. The CPU 40 also performs input/output operation for inputting/outputting necessary data between the ROM 43 and the RAM 44.

The RAM 44 also serves to store incoming facsimile data. More specifically, as shown in FIG. 1, the RAM 44 includes a first storage region 44a for storing incoming facsimile data (image information) transmitted from remote facsimile machines. The first storage region 44a stores a plurality of sets of incoming facsimile data in the order that the plurality of sets of incoming facsimile data have been transmitted to the present facsimile machine 1. For example, the first storage region 44a is configured from a total of "n" storage areas where "n" is an integer greater than one (1). A first set of incoming facsimile data that has been transmitted first to the facsimile machine 1 is stored in the first storage area. A n-th set of incoming facsimile data that has been transmitted at an n-th timing to the facsimile machine 1 is stored in the n-th storage area. Thus, each set of incoming facsimile data that has been transmitted to the facsimile machine 1 at an i-th timing (where "i" is an integer: $1 \leq i \leq n$) is stored in an i-th storage area.

The RAM 44 further serves to store a transfer facsimile number that is transmitted from a remote facsimile machine together with a transfer request and that is a facsimile number of a remote target device, to which incoming image information is desired to be transferred according to the transfer request.

The RAM 44 further serves to be registered with facsimile number(s) of one or more remote facsimile machines, to which the user speculates that he/she will desired to transfer incoming facsimile data. More specifically, as shown in FIG. 1, the RAM 44 further includes a second storage region 44b preregistered with facsimile number(s) of one or more remote facsimile machines, to which incoming image information would be transferred. It is noted that according to the present embodiment, incoming facsimile data can be transferred to any remote facsimile machine in response to a transfer request regardless of whether the transfer facsimile number, that is transmitted together with the transfer request, matches with one of facsimile number(s) registered in the second storage region 44b.

The gate array 42 is connected to an image memory 54 and an encoder sensor 59. The image memory 54 is for temporarily storing, as image data 55, a variety of received data (incoming facsimile data and print data supplied from the personal computer 64). The encoder sensor 59 is for measuring a moving speed of a carriage (not shown), on which the recording head 20 is mounted, and for determining recording timing. The gate array 42 generates a recording clock 57 based on a signal outputted from the encoder sensor 59 in association with the movement of the carriage. The gate array 42 also generates a transfer clock 56. A head driver IC 58 is connected to the gate array 42, and receives image data 55, a recording clock 57, and a transfer clock from the gate array 42. The head driver IC 58 drives the recording head 20 based on the received image data 55, recording clock 57, and transfer clock 56.

The CPU 40 is connected with: a recording sheet sensor 21; a document sensor 51; a carriage origin sensor 52; a first motor driver 50 for driving a carriage motor 14 to move the carriage; a second motor driver 46 for driving a line feed motor 47 for rotating a platen roller (not shown) to feed a recording sheet; a third motor driver 49 for driving an image scanner motor 48 of the image scanner 45; an operation panel 3; and a liquid crystal display device 7.

The recording sheet sensor 21 is for detecting presence or absence of a recording sheet. The document sensor 51 is for detecting whether a document is set in an image retrieval portion of the image scanner 45. The carriage origin sensor 52 is for detecting whether the carriage is in its home position. The operation panel 3 is for enabling a user to input a variety of input signals into the CPU 40.

Although not shown in the drawing, the facsimile machine 1 further has a handset that is provided with push buttons.

Figure 2:
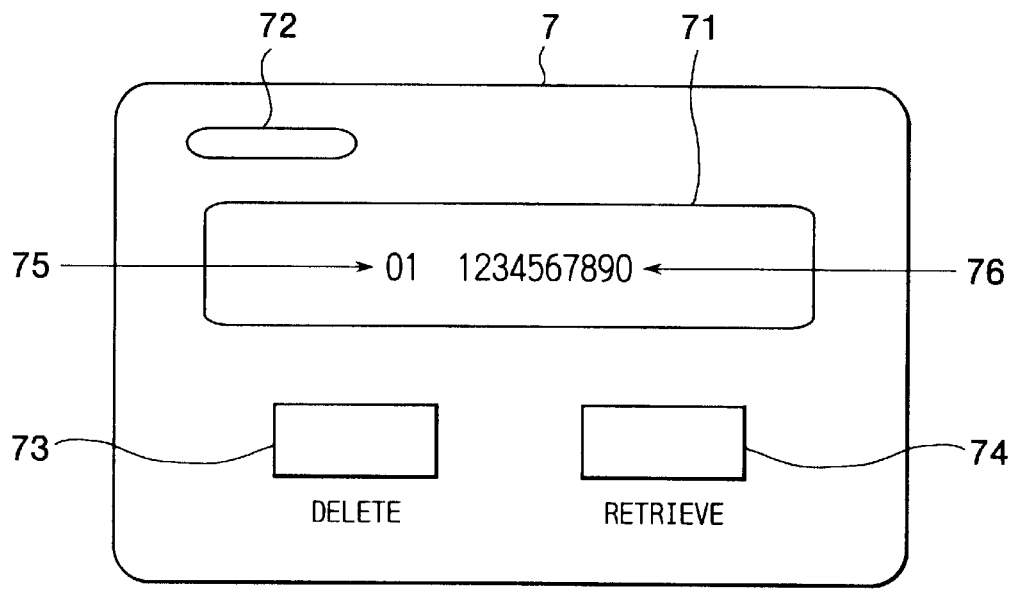
FIG. 2 is a plan view showing configuration of a liquid crystal display provided to the facsimile device 1 of FIG. 1.

The liquid crystal display device 7 will be described below in greater detail while referring to FIG. 2.

The liquid crystal display device 7 includes a liquid crystal display 71, an LED 72, a deletion button 73, and a retrieval button 74. The LED 72 blinks or illuminates when a transfer facsimile number is received from the remote facsimile machine. The liquid crystal display 71 is for displaying: the transfer facsimile number 76 and a registration number 75 indicating an order in which the presently-displayed facsimile number 76 is registered in the second storage region 44b of the RAM 44. For example, the registration number 75 indicates a number "1" when the presently-displayed facsimile number 76 is registered first in the second storage region 44b. The deletion button 73 is for deleting the transfer facsimile number from the RAM 44 in response to the user's depression. The retrieval button 74 is for retrieving the transfer facsimile number from the RAM 44 in response to the user's depression.

Figure 3:
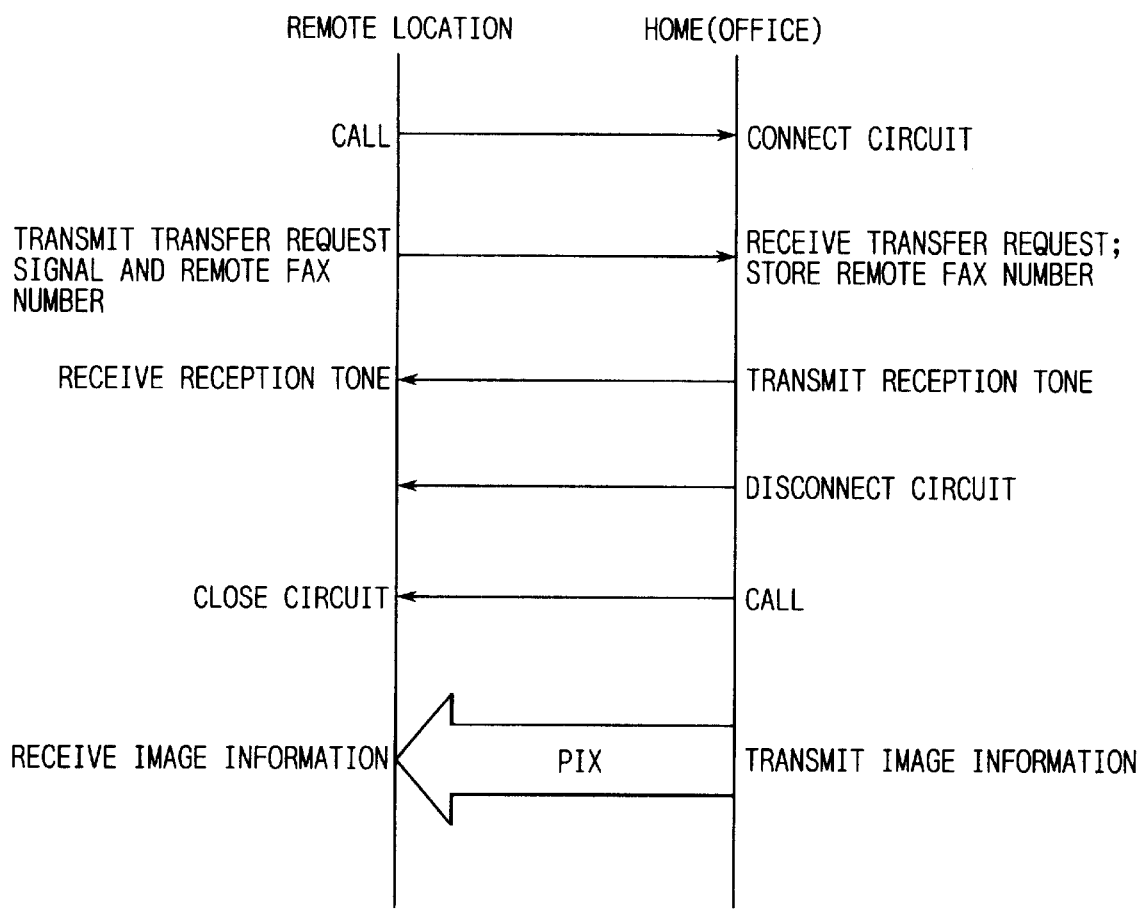
FIG. 3 is a schematic view showing transmission procedures between the facsimile device 1 for transmitting image information and a remote facsimile machine 61 which is to receive the image information.
Figure 4:
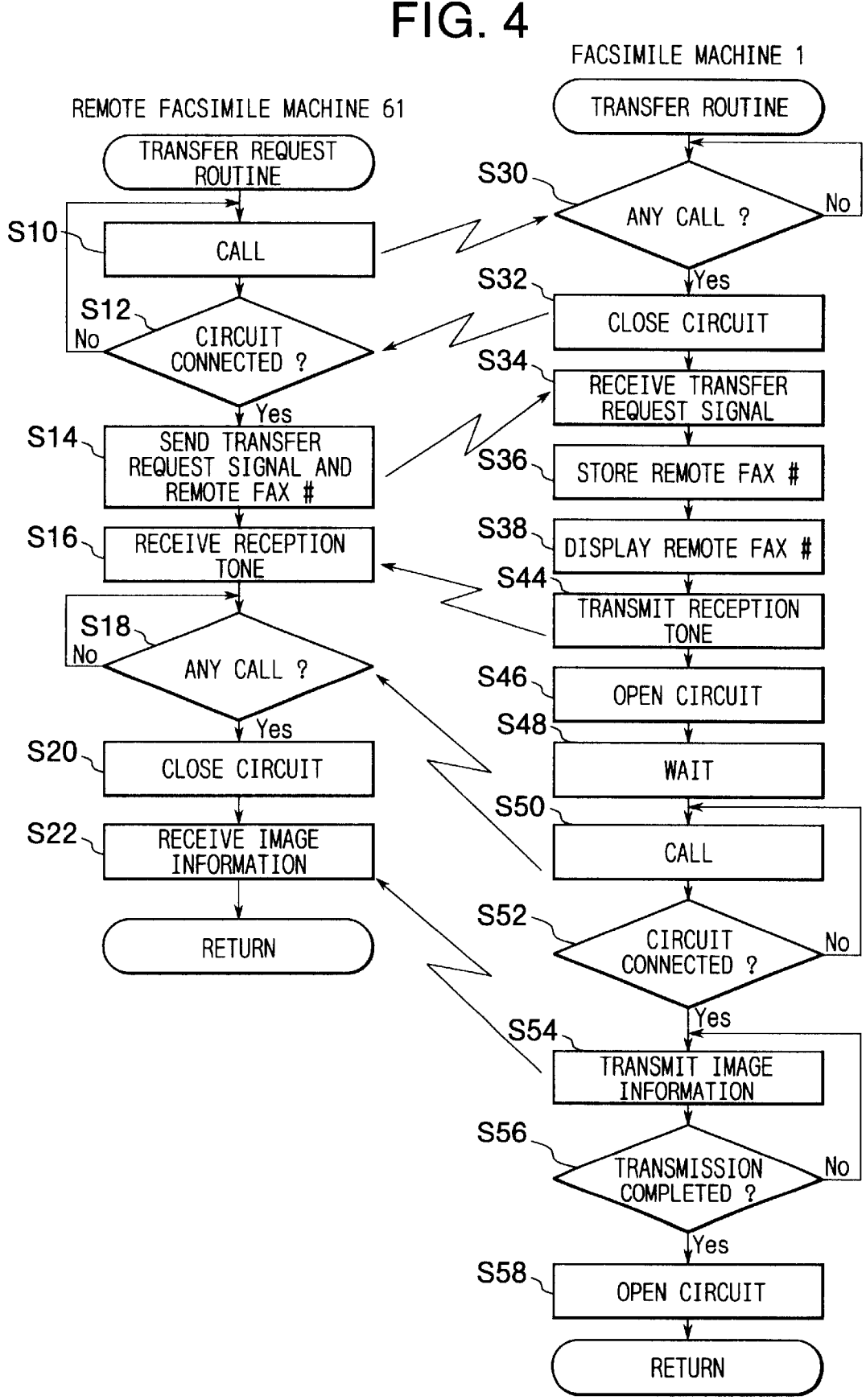
FIG. 4 is a flowchart representing a transfer routine executed by a CPU of the present facsimile device 1 and a transfer request routine executed by the remote facsimile machine 61.

With the above-described structure, the facsimile machine 1 of the present embodiment executes a facsimile transfer control operation as shown in FIGS. 3 and 4 when the facsimile machine 1 receives, from a remote facsimile machine 61, for example, a transfer request for requesting that incoming image information stored in the first storage region 44a of the facsimile machine 1 be transmitted to the remote facsimile machine 61.

More specifically, the remote facsimile machine 61 has the same structure with the present facsimile machine 1 described above. When a CPU 61a provided within the remote facsimile machine 61 executes a transfer request control process shown in the leftside of FIG. 4, the CPU 40 of the facsimile device 1 executes a transfer control shown in the right side of FIG. 4. As a result, a transmission procedure shown in FIG. 3 is attained between the facsimile device 1 which is to transfer incoming image information, and the remote facsimile machine 61, which is where the image information is to be transmitted.

The operations of the facsimile machines 1 and 61 will be described below in greater detail with reference to FIGS. 3 and 4.

In this example, it is assumed that a plurality of sets of incoming image information have already been received at the facsimile machine 1 from remote facsimile machines other than the facsimile machine 61 and that the incoming image information sets are being stored in the first storage region 44a of the RAM 44. The plurality of sets of incoming image information are stored in the first storage region 44a in the order in which the plurality of sets of incoming image information have been received. That is, each set of incoming image information, that has been received by the facsimile machine at an i-th timing (i is an integer; $1 \leq i \leq n$) among all the sets of incoming image information, is stored in a corresponding i-th area in the first storage region 44a.

It is also assumed that the user of the facsimile device 1 is presently being away from his/her home or office where the facsimile device 1 is located. The remote facsimile machine 61 is located where the user is not staying.

When the user of the facsimile machine 1 desired that some incoming image information be transferred from the facsimile machine 1 to the remote facsimile machine 61, the user first operates the remote facsimile machine 61 to designate a predetermined remote control mode by pressing one or more push buttons, provided on a handset of the facsimile machine 61, to input a predetermined remote control code. The user then presses the push buttons to input the facsimile number of the remote facsimile machine 61, to which image information is desired to be transmitted. The user additionally presses the push button(s) to input the number "i" indicative of the order in which the image information desired to be transmitted is stored in the first region 44a of the RAM 44. In other words, the user inputs the number "i" indicative of the i-th storage area in which his/her desired image information is stored in the first storage region 44a.

In response to the above-described operation of the user, the remote facsimile machine 61 starts executing its transfer request control operation as shown in FIG. 4. That is, the remote facsimile machine 61 first calls in S10 the present facsimile device 1. The facsimile device 1 detects the call (S30: YES), and closes the telephone circuit 6 in S32. When the remote facsimile machine 61 detects that the telephone circuit 6 has been closed (S12: YES), then in S14, the remote facsimile machine 61 transmits, to the facsimile device 1, a transfer request signal and the user's inputted facsimile number of the remote facsimile machine 61. The transfer request signal is for requesting that the user's desired image information stored in the storage region 44a be transferred to the remote facsimile machine 61. The transfer request signal includes a signal identifying image information desired to be transferred to the facsimile machine 61. More specifically, the transfer request signal includes an information-designating signal indicating the user's inputted number "i" of the order in which the desired image information is stored in the first storage region 44a.

The present facsimile machine 1 receives in S34 the transfer request signal and the remote facsimile number (transfer facsimile number) from the remote facsimile machine 61. Then in S36, the facsimile device 1 accepts the transfer request from the remote facsimile machine 61, and temporarily stores the remote facsimile number (transfer facsimile number) in the RAM 44.

Next, the facsimile device 1 displays the thus stored remote facsimile number on the liquid crystal display 71 in S38. Then, in S44, the present facsimile device 1 sends a reception sound, such as a beeping noise or voice saying "We have received your transfer request", to the remote facsimile machine 61 to inform that the transfer request has been accepted. The remote facsimile machine 61 receives the reception sound in S16. Hearing the reception sound at the remote facsimile machine 61, the user can confirm that the request has been properly received at the facsimile machine 1.

Then, the present facsimile device 1 opens the telephone circuit in S46 to temporarily stop communication with the remote facsimile machine 61. Then, in S48, the present facsimile machine 1 waits for a predetermined duration of time before starting transmission of the request image information to the remote device 61. An example of the predetermined duration time is one minute. This duration of time may be other than one minute, but may be other values such as ten seconds. This duration of time should be determined dependently on time required by the facsimile device 1 to complete preparations to initialize the communication modem 60 and call the remote facsimile machine 61 and on time required by the remote facsimile machine 61 to complete preparations to receive incoming messages.

After the predetermined duration of time has passed after the telephone circuit is disconnected in S46, the facsimile device 1 retrieves in S50 the remote facsimile number that is temporarily being stored in the RAM 44, and dials the remote facsimile number to call the remote facsimile machine 61. When the remote facsimile machine 61 detects the call (S18: YES), then the remote facsimile machine 61 closes the telephone circuit in S20. When the present facsimile device 1 detects that the telephone circuit is closed (S52: YES), then, in S54, the facsimile device 1 retrieves, from the first storage region 44a, the image information designated by the transfer request. That is, the facsimile machine 1 retrieves image information from the i-th storage area indicated by the information-designation signal included in the transfer request. The facsimile machine 1 transfer the retrieved image information to the remote facsimile machine 61. The remote facsimile machine 61 receives the thus transferred image information in S22, and reproduces the image information onto a recording sheet. When the facsimile device 1 completes transfer of the image information (S56: YES), then the facsimile machine 1 opens the telephone circuit in S58.

As described above, according to the present embodiment, the remote facsimile machine 61 calls the present facsimile device 1 in S10 so that the facsimile machine 1 will close the telephone circuit in S32. When the remote facsimile machine 61 detects the circuit connection in S12, the remote facsimile machine 61 transmits in S14 a transmission request signal and a facsimile number of the subject remote facsimile 61 to the facsimile device 1. The facsimile device 1 receives in S34 the transmission request signal and the remote facsimile number. The facsimile device 1 then disconnects the telephone connection in S46 after storing the remote facsimile number transmitted from the remote facsimile machine 61 in the RAM 44. Then, the facsimile device 1 calls in S50 the remote facsimile machine 61 based on the remote facsimile number received in S34, and transmits stored image information to the remote facsimile machine 61.

In this way, the present facsimile device 1 can receive the facsimile number of the remote facsimile machine 61 from that facsimile machine 61, call the remote facsimile machine 61 based on the received remote facsimile number, and then transfer the image information to the remote facsimile machine 61. Accordingly, there is no need to preregister the facsimile number of the remote facsimile machine 61 in the present facsimile device 1. As long as the remote facsimile machine 61 has a function for transmitting its facsimile number to the present facsimile machine 1 in response to the user's operation, the present facsimile machine 1 will be able to transfer image information to the remote facsimile machine 61 even if the remote facsimile machine 61 is not the one that the user has prespecified in the second storage region 44b.

The present facsimile machine 1 transfer image information to the remote facsimile machine 61 by calling the remote facsimile machine 61 after temporarily disconnecting the telephone line. Accordingly, the burden of the transmission cost required to transfer the image information to the remote facsimile machine 61 are born on the present facsimile device 1 so that the remote facsimile machine 61 need not bear the burden of the transmission cost.

When a transfer request is received from the remote facsimile machine 61, the facsimile number of the remote facsimile machine 61 is displayed at the liquid crystal display device 7. Accordingly, a person who is at the present facsimile device 1 can known who is requesting transfer of image information.

Second Embodiment

Next, a facsimile machine according to a second embodiment of the present invention will be described while referring to FIG. 5.

The facsimile machine 1 according to the second embodiment can transfer image information only to remote facsimile machine(s) whose facsimile number(s) is registered in the second storage region 44b.

Figure 5:
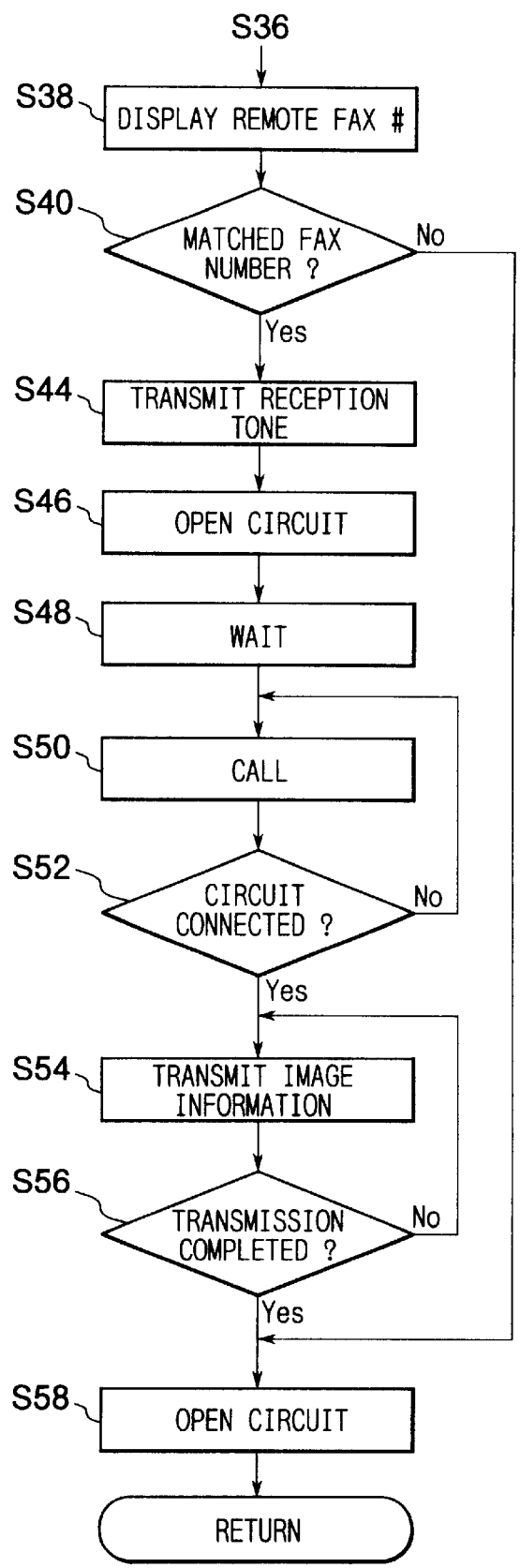
FIG. 5 is a flowchart showing a portion of a transfer routine executed by the CPU of the facsimile machine according to a second embodiment of the present invention.

The facsimile machine 1 of the present embodiment is the same as that of the facsimile device 1 of the first embodiment except that the facsimile device 1 of the first embodiment except that the facsimile machine 1 performs the facsimile transfer routine as shown in FIG. 5. It is noted that the facsimile transfer routine of the present embodiment (FIG. 5) is the same as that of the first embodiment (FIG. 4) except hat a judging step of S40 is added between the processes of S38 and S44.

According to the present embodiment, after storing the received remote facsimile number in the RAM 44 in S36 and displaying the remote facsimile number on the liquid crystal display 71 in S38, then in S40, the CPU 40 of the present facsimile machine 1 judges whether or not the remote facsimile number presently displayed on the liquid crystal display 71 matches any one of the one or more facsimile number preregistered in the second storage memory region 44b. When the facsimile device 1 judges that the displayed remote facsimile number matches one facsimile number registered in the second storage region 44b (S40: YES), then in S44, the facsimile device 1 sends a reception sound to the remote facsimile machine 61 in the same manner as in the first embodiment. The facsimile machine 1 will then perform the image information transferring operation in the same manner as in the first embodiment through the processes of S46–S58. On the other hand, when the facsimile device 1 judges that no facsimile number registered in the second storage region 44b matches the displayed remote facsimile number (S40: NO), then the facsimile machine 1 immediately disconnects the telephone line 6 in S58, and terminates the transfer routine.

Thus, according to the second embodiment, when the present facsimile device 1 receives the transfer request from the remote facsimile machine 61, the present facsimile device 1 transmits image information to the remote facsimile machine 61 only when the facsimile number of the remote facsimile machine 61, that has been transmitted from the remote facsimile machine 61, is registered in the RAM 44. With this control, the facsimile machine 1 will not transmit image information to any of the user's unspecified, non-registered remote facsimile machines even when a transfer request is transmitted from those remote facsimile machines.

Similarly to the first embodiment, the present facsimile machine 1 transmits image information to the remote facsimile machine 61 by calling the remote facsimile machine 61 after temporarily disconnecting the connection with the remote facsimile machine 61. This properly avoids burdening an owner of the remote facsimile machine 61 with transmission cost.

Third Embodiment

Next, a facsimile machine according to a third embodiment of the present invention will be described while referring to FIG. 6.

The facsimile device 1 according to the third embodiment does not transfer image information to the remote facsimile machine when an amount of the image information requested to be transferred exceeds a predetermined information amount.

Figure 6:
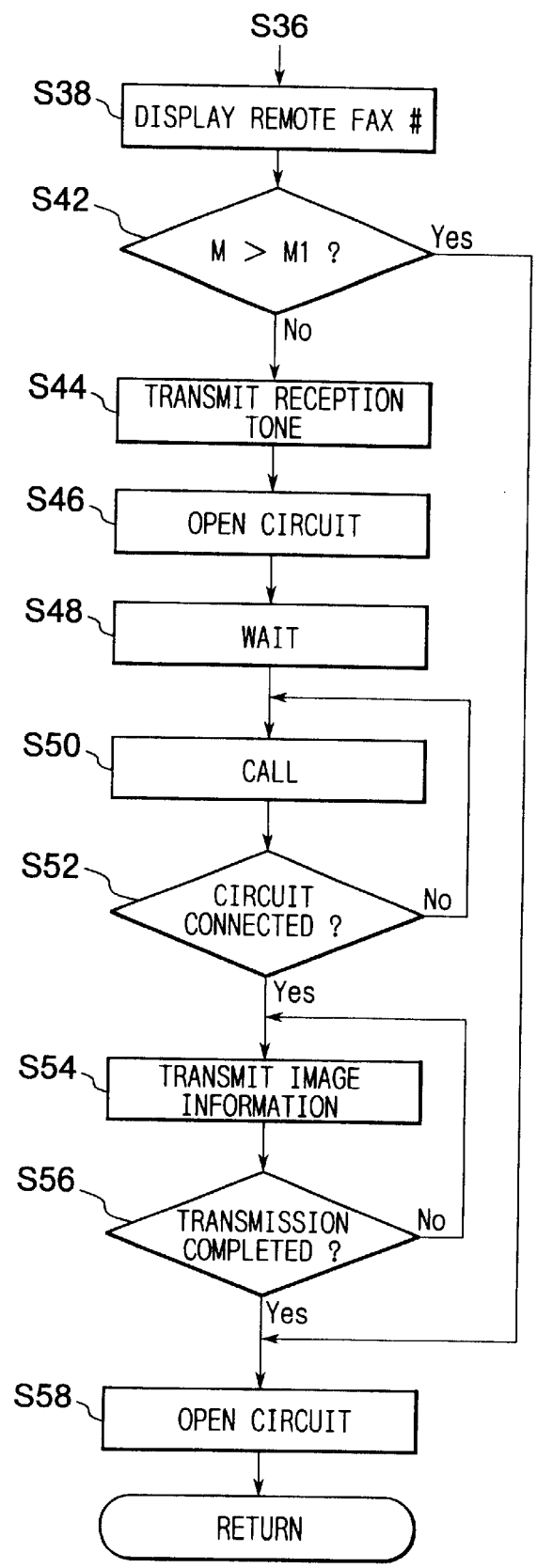
FIG. 6 is a flowchart representing a portion of a transfer routine executed by the CPU of the facsimile device according to a third embodiment of the present invention.

The facsimile machine 1 of the present embodiment is the same as that of the facsimile device 1 of the first embodiment except that the facsimile machine 1 performs the transfer routine as shown in FIG. 6. It is noted that the transfer routine of the present embodiment (FIG. 6) is the same as that of the first embodiment (FIG. 4) except that a judging process of S42 is added between the processes of S38 and S44.

According to the present embodiment, after displaying the received remote facsimile number on the liquid crystal display 71 in S38, then in S42, the present facsimile device 1 retrieves, from the first storage region 44a, the image information requested to be transferred to the remote facsimile machine 61. The present facsimile machine 1 then judges whether or not a data amount M of the retrieved image information exceeds a predetermined data amount M1 that is preset in the RAM 44, for example.

When the facsimile device 1 judges that the information amount M of the retrieved image information does not exceed the predetermined amount M1 (S42: NO), then in S44, the facsimile device 1 transmits the reception sound to the remote facsimile machine 61 in S44. Then, the facsimile machine 1 will perform image information transfer operation in S46–S58 in the same manner as in the first embodiment. On the other hand, when the facsimile device 1 judges that the information amount M of the retrieved image information exceeds the predetermined amount M1 (S42: YES), the facsimile machine 1 immediately disconnects the telephone circuit, thereby terminating the transfer routine.

In this way, according to the third embodiment, even when the facsimile device 1 receives a transfer request from the remote facsimile machine 61, the facsimile machine 1 determines not to transfer the image information to the remote facsimile machine 61 if the amount of the requested image information is too large to be transferred to the remote device 61. With the control, it is possible to solve a potential problem that the user at the remote facsimile machine 61 will notice a large amount of information only after reception of the information has started and that transmission time becomes too long so that the transmission cost will excessively increase.

Fourth Embodiment

Next, a facsimile machine according to a fourth embodiment of the present invention will be described while referring to FIG. 7.

The facsimile machine 1 according to the fourth embodiment can transfer image information to the remote facsimile machine 61 only when the amount M of the requested image information does not exceed the predetermined information amount M1 and the remote facsimile machine 61, to which image information is requested to be transferred, is registered in the second storage region 44b.

Figure 7:
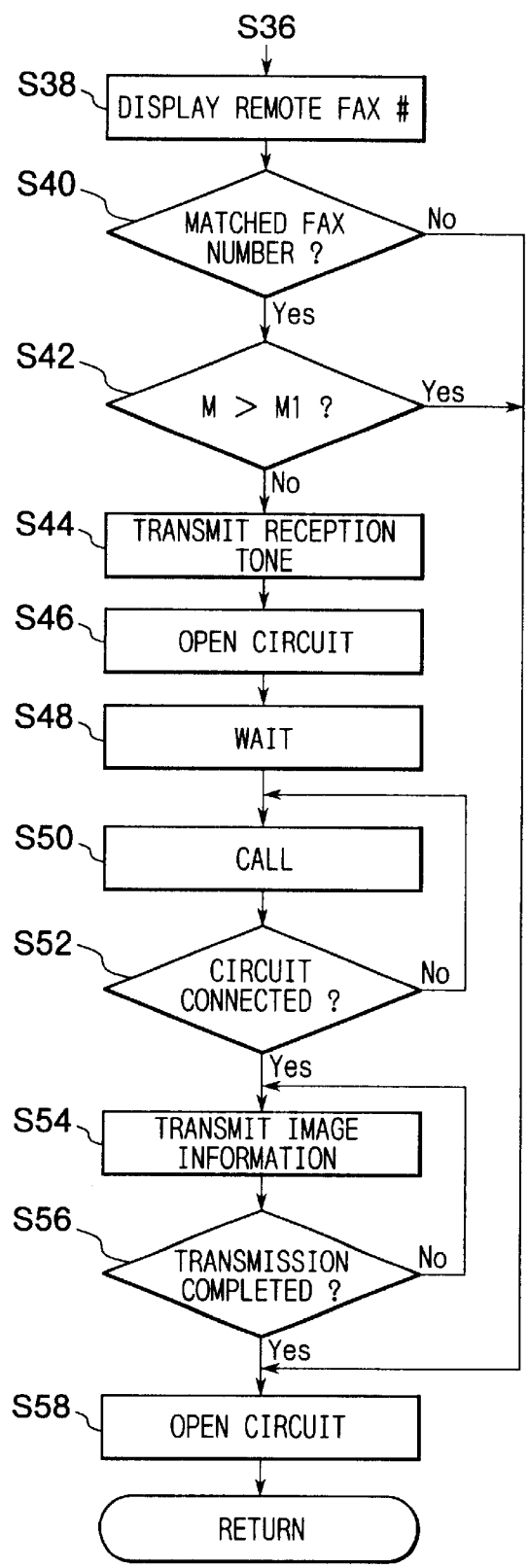
FIG. 7 is a flowchart representing a portion of a transfer routine executed by the CPU of the facsimile device according to a fourth embodiment.

The facsimile machine 1 of the present embodiment is the same as that of the facsimile device 1 of the first embodiment except that the facsimile machine 1 performs the transfer routine as shown in FIG. 7. It is noted that the transfer routine of the present embodiment (FIG. 7) is the same as that of the first embodiment (FIG. 4) except that judging processes of S40 and S42 are added between the processes of S38 and S44.

According to the present embodiment, after displaying the received remote facsimile number on the liquid crystal display 71 in S38, the facsimile device 1 judges in S40 whether or not the displayed remote facsimile number matches any transfer facsimile number registered in the memory region 44b. this process is executed in the same manner as in S40 of the second embodiment. When some matching transfer facsimile number is registered (S40: YES), then in S42, the facsimile device 1 further judges whether or not the information amount M of the requested image information exceeds the predetermined information amount M1. This process is executed in the same manner as in S42 of the third embodiment. If the information amount M of the requested image information does not exceed the information amount M1 (S42: NO), then the facsimile device 1 transmits in S44 the reception sound to the remote facsimile machine 61. Then, the facsimile machine 1 will perform transfer operation in S46–S58 in the same manner as in the first embodiment.

On the other hand, when the facsimile device 1 determines that no registered facsimile number matches the received remote facsimile number (S40: NO) or when the facsimile device 1 determines that the information amount M of the requested image information exceeds the predetermined information amount M1 (S42:YES), then the facsimile machine 1 immediately disconnects the telephone circuit in S58, and terminates the transfer routine.

In this way, the facsimile device 1 according to the fourth embodiment is prevented from transferring image information to any unregistered remote facsimile machines. The facsimile machine 1 is also prevented from transferring too great amounts of image information to remote facsimile machines. The transmission cost will not become too expensive.

Fifth Embodiment

Next, a facsimile machine according to a fifth embodiment of the present invention will be described while referring to FIG. 8.

The facsimile machine 1 according to the fifth embodiment can transfer image information to a third party when the user would like the facsimile machine 1 to transfer image information to the third party facsimile machine and accordingly operates the remote facsimile machine 61 to send, to the facsimile machine 1, the facsimile number of the third party together with the transfer request.

Figure 8:
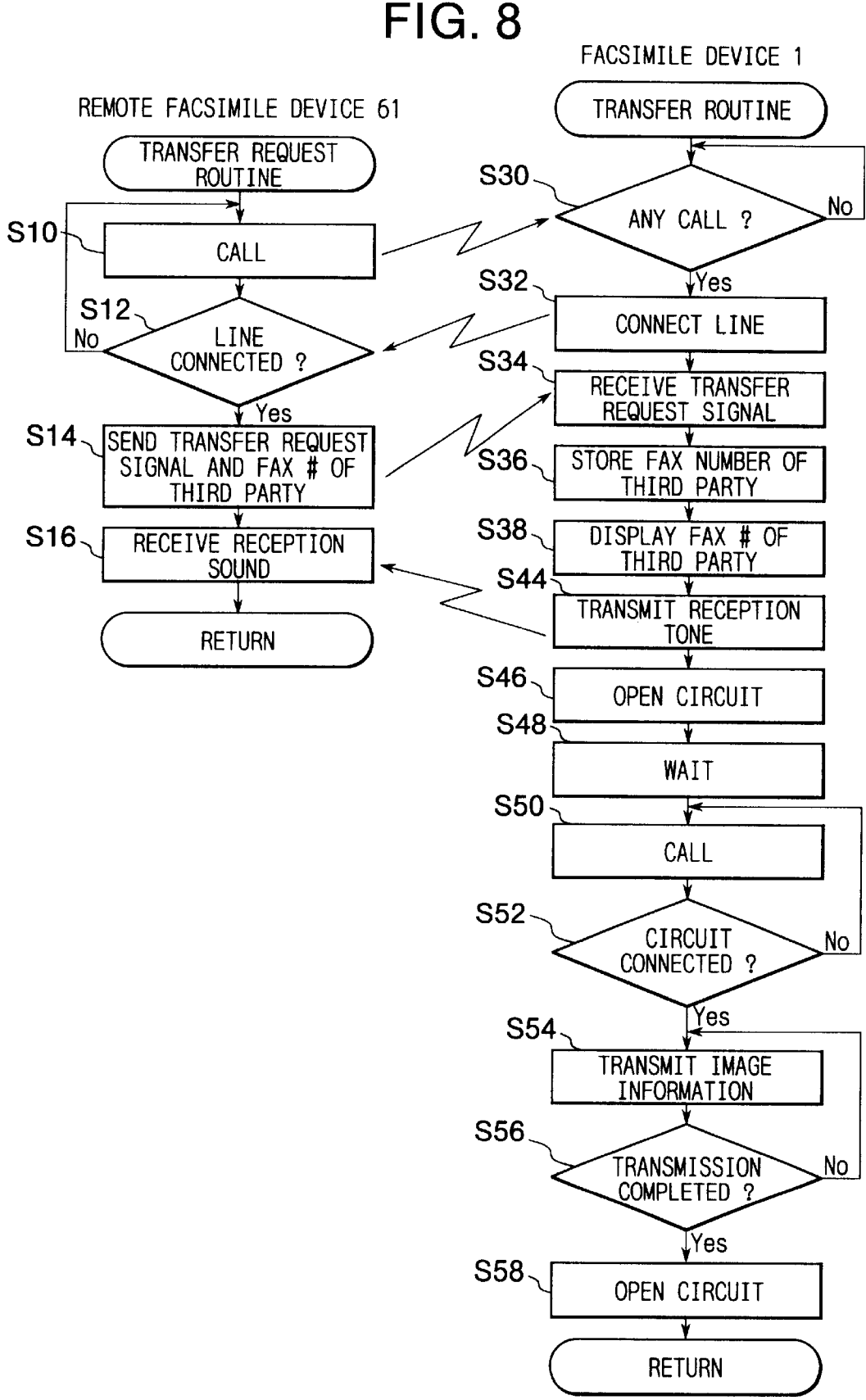
FIG. 8 is a flowchart representing a transfer routine executed by the CPU of the facsimile device 1 according to a fifth embodiment and a transfer request routing executed by the remote facsimile machine 61.

The facsimile machine 61 of the present embodiment is the same as that of the facsimile device 61 of the first embodiment except that the facsimile machine 61 performs a transfer request routine as shown in the left side of FIG. 8. The facsimile machine 1 of the present embodiment is the same as that of the facsimile device 1 of the first embodiment except that the facsimile machine 1 performs a facsimile transfer routine as shown in the right side of FIG. 8.

It is noted that the transfer request routine and the facsimile transfer routine of the present embodiment (FIG.

8) are the same as those of the first embodiment (FIG. 4) except for the points described below.

According to the present embodiment, during the facsimile transfer control, the user of the present facsimile machine 1, who is presently at the remote facsimile machine 61, inputs a facsimile number of a third party, to which the image information is desired to be transmitted. Accordingly, the remote facsimile machine 61 transmits, in S14, a transfer request signal and the facsimile number of the third party to the facsimile device 1. The present facsimile machine 1 therefore executes the process of S36 for storing the received third party facsimile number in the RAM 44, and executes the image transmitting processes of S50 through S58 to transmit image information to the third party device. In this case, the remote facsimile machine 61 that has requested the present facsimile machine 1 to transfer image information to the third party will not receive a call from the facsimile machine 1. Accordingly, the facsimile machine 61 performs only transfer request control processes of S10–S16 as shown in FIG. 8. That is, the facsimile machine 61 does not perform image information reception processes of S18–S22 (FIG. 4) of the first embodiment.

The operation of the facsimile machine 1 and 61 according to the present embodiment will be described below in greater detail.

The user of the present facsimile machine 1, who is presently at the remote facsimile machine 61, first operates the remote facsimile machine 61 to designate the remote control mode by pressing the push buttons to input the predetermined remote control code. The user then presses the push buttons to input the facsimile number of the third party facsimile machine, to which image information is desired to be transmitted. The user further inputs the number "i" indicative of the i-th storage area in which the image information desired to be transmitted is stored in the first storage region 44a.

In response to the user's operation, the remote facsimile machine 61 first calls in S10 the present facsimile device 1. The facsimile device 1 detects the call (S30:YES), and closes the telephone circuit in S32. When the remote facsimile machine 61 detects that the telephone circuit has been closed (S12:YES), the remote facsimile machine 61 transmits, in S14, a transfer request signal and the facsimile number of the third party to the facsimile device 1. The transfer request signal requests that the user's desired image information be transferred to the third party facsimile machine. The transfer request signal includes the information-designating signal identifying the image information desired to be transferred to the facsimile machine 61, that is, the number "i" indicative of the storage area where the desired image information is stored in the first storage region 44a.

The present facsimile machine 1 receives in S34 the transfer request signal and the third party facsimile number from the remote facsimile machine 61. Then in S36, the facsimile device 1 accepts the transfer request from the remote facsimile machine 61, and temporarily stores the third party facsimile number in the RAM 44.

Next, the facsimile device 1 displays the thus stored third party facsimile number on the liquid crystal display 71 in S38. Then, in S44, the present facsimile device 1 sends a reception sound, such as a beeping noise or voice saying "We have received your transfer request", to the remote facsimile machine 61 to inform that the transfer request has been accepted. The remote facsimile machine 61 receives the reception sound in S16.

Then, the present facsimile device 1 disconnects the telephone circuit in S46 to terminate the communication presently established with the remote facsimile machine 61. Then, in S48, the present facsimile machine 1 waits for the predetermined duration of time before starting transmission of the requested image information to the third party. This duration of time is determined dependently on time required by the facsimile device 1 to complete preparations to initialize the communication modem 60 and call the third party.

After the predetermined duration of time has passed after the telephone circuit 6 is disconnected in S46, the facsimile device 1 retrieves in S50 the third party facsimile number that is temporarily being stored in the RAM 44, and dials the third party facsimile number to call the third party facsimile machine. When the present facsimile device 1 detects that the telephone circuit is connected (S52:YES), then, in S54, the facsimile device 1 retrieves, from the first storage region 44a, the image information designated by the transfer request, and transfers the retrieved image information to the third party facsimile machine. When the facsimile device 1 completes transfer of the image information (S56:YES), then the facsimile machine 1 disconnects the telephone circuit in S58.

With this configuration, when the present facsimile machine 1 receives, from the remote facsimile machine 61, a request for transferring image information to the third party facsimile machine, the facsimile device 1 stores the third party's facsimile number, that is also transmitted from the remote facsimile machine 61, in the RAM 44, before terminating the telephone connection. Then, the facsimile device 1 calls the third party facsimile machine using the third party's facsimile number stored in the RAM 44, and then transmits the image information stored in the RAM 44 to the third party facsimile machine.

Thus, the facsimile device 1 terminates the connection with the remote facsimile machine 61, calls the third party facsimile machine, and then transmits image information to the third party facsimile machine. Accordingly, transmission cost required to transfer the image information will be built to the owner of the present facsimile device 1 so that transmission cost will not place a burden on the owner of the third party facsimile machine.

The judgement processes of S40 and/or S42 (FIGS. 5–7) can be added to the processes of the present embodiment in the same manner as in the second through fourth embodiments.

While the invention has been described in detail with reference to the specific embodiments thereof, it would be apparent to those skilled in the art that various changes and modifications may be made therein without departing from the spirit of the invention.

For example, according to the second and fourth embodiments described above, the facsimile device 1 transmits image information to the remote facsimile machine 61 when a facsimile number of the remote facsimile machine transmitted therefrom matches some facsimile number registered in the second storage region 44b. However, a code number or password, that is known only by the user of the present facsimile machine 1, can be preregistered in the facsimile machine 1. In this case, the user may input the code number when he/she operates the remote facsimile machine 61 to designate the remote control mode. The remote facsimile machine 61 will transmit the inputted code number to the present facsimile device 1 together with the remote facsimile number. Before or after the process of S40, the present facsimile device 1 may judge whether or not the received code number matches the preregistered code number. The present facsimile machine 1 will transfer image information to the remote facsimile machine 61 only when the received remote facsimile number matches some registered facsimile number and the received code number matches the registered code number. According to this modification, even when an unauthorized person learns the registered transfer facsimile number, it can still be ensured that image information will not be transferred to the unauthorized person because he or she does not know the code number.

In the above-described embodiments, when the facsimile machine 1 judges that image information can be transferred to the user's designated device, the facsimile machine 1 transmits a reception sound in S44. However, when the facsimile device 1 judges that image information can not be transferred to the user's designated device, the facsimile device 1 may transmit a verbal signal stating that image information can not be transmitted to the designated device.

In the above-described first through fourth embodiments, image information is transmitted to the remote facsimile machine 61 after connection between the facsimile machine 1 and the remote facsimile machine 61 is disconnected. However, the connection between the facsimile machine 1 and the remote facsimile machine 61 may not be disconnected. That is, the processes of S46–S52 may be omitted. Image information can be transmitted from the facsimile machine 1 to the remote facsimile machine 61 while the telephone circuit 6 remains closed.

In the first through fourth embodiments described above, the remote facsimile machine 61 calls the facsimile device 1 to request transfer of image information to the subject facsimile machine 61. However, when a remote telephone 62 is provided to share a single telephone number with the remote facsimile machine 61, the remote telephone 62 can first call the facsimile device 1 to request that image information be transferred to the telephone number of the telephone 62. After hearing the reception sound in S16 by the remote telephone 62, the user may operate to switch the connection with the telephone circuit so that the facsimile machine 61 can receive image information being transferred.

In the embodiments described above, the transmitted facsimile number is displayed at the LCD 7 in S38 so that a person at the facsimile machine 1 can know who requests transfer of image information. However, the process of S38 may be omitted. That is, the transmitted facsimile number may not be displayed.

In the above-described embodiments, the plurality of sets of incoming facsimile data (image information) are stored in the first storage region 44*a* of the RAM 44 in the order in which the plurality of sets of incoming facsimile data have been received in the present facsimile machine 1. Accordingly, the user designates his/her desired image information by designating the number "i" of the order in which the user's desired information is received. In other words, the user designates the number "i" of the i-th storage area where the user's desired information is stored in the region 44*a*. However, other various methods for designating the user's desired image information can be employed.

For example, incoming facsimile data may be stored together with identification number data in the first area 44*a* of the RAM 44. More specifically, a remote source may add each set of facsimile data with corresponding identification number data before transmitting the facsimile data to the present facsimile machine 1. Each facsimile data set is therefore received by the facsimile machine 1 and is stored in the region 44*a* together with corresponding identification number data. In this case, the user of the present facsimile machine 1, who is presently being at the remote facsimile machine 61, can designate his/her desired image information by inputting the corresponding identification number. The remote facsimile machine 61 will transmit, to the present facsimile machine 1, data of the identification number together with the facsimile number of a remote facsimile machine, to which the information is desired to be transferred. Receiving the identification number, the present facsimile machine 1 will retrieve the user's desired image information and transmit the image information to the user's desired device.

Or, each set of incoming image information can be stored in the first area 44*a* of the RAM 44 in association with a corresponding code number which is known only by the user of the present facsimile machine 1. In order to designate the user's desired image information at the remote facsimile machine 61, the user may input the code number indicative of his/her desired image information. The remote facsimile machine 61 will transmit, to the present facsimile machine 1, the code number together with the facsimile number of a remote facsimile machine, to which the information is desired to be transmitted. Receiving the code number, the present facsimile machine 1 will retrieve the user's desired image information and transmit the image information to the user's desired remote device.

In the embodiments described above, the facsimile transfer routines represented by the flowcharts in FIGS. 4 to 8 are executed by the CPU 40 of the facsimile device 1. However, the facsimile transfer routines can be executed by a CPU 64*a* in the personal computer 64. More specifically, data of a computer program for executing the facsimile transfer routines of FIGS. 4 to 8 can be stored on a CD-ROM or floppy disk 70. The computer program is read from the CD-ROM or floppy disk 70 by a drive mechanism 64*c* provided to the personal computer 64, and is installed in a hard disk drive 64*b*. The CPU 64*a* executes the computer program thus installed in the hard disk drive 64*b*.

Thus, the information transfer operation of the present invention may be controlled by the CPU 40 mounted in the facsimile machine 1 or controlled by the computer 64 connected to the facsimile machine 1. An information transmission device can therefore be realized in both cases when the facsimile machine 1 is mounted with a data storage medium in the form of the ROM 43 and when the computer 64 connected to the facsimile machine 1 is installed with a computer program which is originally stored in the data storage medium such as the floppy disk 70.

Similarly, the transfer request operation of FIGS. 4 and 8 executed by the facsimile machine 61 can be executed by a computer (not shown) connected to the facsimile machine 61. That is, a data storage medium such as a floppy disk 70 may be initially stored with a control program of the transfer request operation. The control program may be installed into the computer and executed by the computer.

In the embodiments described above, incoming image information is stored in the first memory area 44*a* of the RAM 44. However, the image information can be stored in the hard disk drive 64*b* of the personal computer 64.

The present invention can be applied not only to facsimile machines but also to any other information transmission devices such as a personal computer including a communication modem or a telephone having an answering machine function.

For example, the facsimile machine 1 of the present invention can be applied as a data base center for supplying image information stored therein to terminal facsimile machines (remote facsimile machines 61) by facsimile transmission procedures. In this case, the data base center 1 is provided with a hard disk device or the like that is prestored with a plurality of sets of image information. When an end user at one remote facsimile machine 61 would like to obtain one set of image information stored in the data base center 1, the remote facsimile machine 61 calls in S10 the data base center 1 to connect the remote facsimile machine 61 to the data base center 1. Then, in S14, the remote facsimile machine 61 transmits, to the data base center 1, the facsimile number of the facsimile machine 61 and a transfer request signal including an information-designating signal (search keyword) that indicates the user's desired information. Upon receipt of the transfer request signal, the data base center 1 immediately disconnects in S46 the connection between the data base center 1 and the remote facsimile machine 61. The data base center 1 then searches its own hard disk or the like to find out the user's requested image information. Once the search is completed and the user's requested image information is found out, the base center 1 will call the remote facsimile machine 61 in S50 and will transmit the searched out data to the remote facsimile machine 61 by facsimile transmission in S54.

It is noted that it usually takes a long period of time to search the data base to find the user's requested data in comparison with the period of time taken by actual facsimile transmission procedure. If the connection is maintained while the search is being performed, the time spent waiting for the search result will be added as an extra-transmission cost. This will result in excessive increases in the transmission cost. However, according to the above-described configuration, connection is terminated while search is being performed by the data base center 1. Accordingly, the transmission cost can be prevented from excessively increasing.

The present invention can be applied to various types of information transmission devices for transmitting information such as image information and audio information. It is noted, however, that great advantages are obtained when the present invention is applied to a facsimile machine. This is because image information is generally constructed from a larger amount of data then audio information. It takes a longer period of time to transmit image information to remote devices than to transmit audio information. Transmission cost will be higher for the image information transmission than for the audio information transmission. Especially, according to the embodiments, after a remote device calls the present facsimile machine to request the present facsimile machine to transmit information to the remote device, the present facsimile machine terminates connection with the remote device. Then, the present facsimile machine calls the remote device to transmit the information to the remote device. Accordingly, the remote facsimile machine will not be responsible to pay the transmission cost.

What is claimed is:

1. An information transmission device, comprising:
   means for storing information;
   means for detecting data specifying a remote target device, to which the information is desired to be transmitted; and
   means for transmitting the information to the remote target device based on the remote target device specifying data;
   wherein the detecting means includes:
      call detecting means for detecting a call from a remote requesting device and for establishing a first connection with the remote requesting device; and
      request detecting means for detecting the remote target device specifying data transmitted from the remote requesting device through the established first connection;
   wherein the request detecting means includes means for disconnecting the first connection with the remote requesting device after the remote target device specifying data is detected, and
   wherein the transmitting means includes means for transmitting a call signal for calling the remote target device so that a second connection will be established with the remote target device after the first connection is disconnected, the information being transmitted to the remote target device through the second established connection.

2. An information transmission device as claimed in claim 1, further comprising:
   means for storing at least one set of data indicating at least one predetermined remote device; and
   means for judging whether the detected remote target device specifying data matches with one of the at least one set of predetermined remote device indicating data;
   wherein the transmitting means includes means for, when the detected remote target device specifying data matches with one of the at least one set of predetermined remote device indicating data, terminating communication with the remote requesting device, calling the remote target device specified by the remote target device specifying data, and then transmitting the information to the remote target device.

3. An information transmission device as claimed in claim 1, further comprising means for judging whether an amount of the information requested to be transmitted to the remote target device exceeds a predetermined information amount,
   wherein the transmitting means includes means for, when the amount of the requested information does not exceed the predetermined information amount, terminating communication with the remote requesting device, calling the remote target device specified by the remote target device specifying data, and then transmitting the information to the remote target device.

4. An information transmission device as claimed in claim 1, further comprising:
   means for storing at least one set of data indicating at least one predetermined remote device;
   means for judging whether the detected remote target device specifying data matches with one of the at least one set of predetermined remote device indicating data; and
   means for judging whether an amount of the information requested to be transmitted to the remote target device exceeds a predetermined information amount;
   wherein the transmitting means includes means for, when the detected remote target device specifying data matches with one of the at least one set of predetermined remote device indicating data and the amount of the requested information does not exceed the predetermined information amount, terminating communication with the remote requesting device, calling the remote target device specified by the remote target device specifying data, and then transmitting the information to the remote target device.

5. An information transmission device as claimed in claim 1, further comprising means for displaying the detected remote target device specifying data.

6. An information transmission device as claimed in claim 1, wherein the information storing means stores image information, and the information transmitting means transmits image information to the remote target device.

7. An information transmission device as claimed in claim 1, wherein the storing means stores therein at least one set of information,
   wherein the remote target device specifying data includes data identifying the information desired to be transmitted to the remote target device, the transmitting means retrieving one set of information, identified by the information identifying data, from the storing means and transmitting the information to the remote target device.

8. An information transmission device as claimed in claim 7, wherein the storing means stores therein at least one set of information transmitted from at least one remote source,
   wherein the remote target device specifying data includes data identifying the information desired to be transferred to the remote target device, the transmitting means retrieving one set of information, identified by the information identifying data, from the storing means and transmitting the information to the remote target device.

9. An information transmission device as claimed in claim 1, wherein the remote target device is the same as the remote requesting device.

10. An information transmission device as claimed in claim 1, wherein the remote target device is different from the remote requesting device.

11. An information transmission device, comprising:
   means for storing information;
   means for receiving, through a telephone circuit connected to a remote requesting device, a transmission request signal for requesting transmission of the information and data specifying a remote target device, to which the information is desired to be transmitted;
   means for storing the received remote target device specifying data;
   control means for, after reception of the transmission request signal and the remote target device specifying data, disconnecting the telephone circuit presently connected to the remote requesting device, and thereafter calling the remote target device based on the remote target device specifying data; and
   means for transmitting the information to the remote target device via a telephone circuit connected by the control means.

12. An information transmission device as claimed in claim 11, wherein the remote target device is the same as the remote requesting device.

13. An information transmission device as claimed in claim 11, wherein the remote target device is different from the remote requesting device.

14. An information supplying system, comprising:
   a terminal, including:
      means for designating a target terminal, to which information is desired to be transmitted; and
      means for transmitting data specifying the target terminal to an information supplying device and for requesting the information supplying device to transmit the information to target terminal, and
   the information supply device, including
      means for receiving the target terminal specifying data; and
      means for transmitting the information to the target terminal based on the remote target terminal specifying data;
   wherein the target terminal specifying data transmitting means includes means for calling the information supplying device, and
   wherein the target terminal specifying data receiving means includes call detecting means for detecting a call from the terminal and for establishing a connection with the terminal;
   wherein the target terminal specifying data transmitting means transmits the target terminal specifying data to the information supplying device through the established connection;
   wherein the target terminal specifying data receiving means further includes means for disconnecting the connection with the terminal after receiving the target terminal specifying data; and
   wherein the information transmitting means includes means for calling the target terminal so that a new connection will be established with the target terminal, the information being transmitted to the target through the new established connection.

15. A data storage medium storing data of a computer program for controlling an information transmission device to transmit information, stored in the information transmission device, to a remote target device, the computer program comprising:
   a computer program of detecting data specifying a remote target device, to which information is desired to be transmitted;
   a computer program of transmitting the information to the remote target device based on the remote target device specifying data;
   wherein the detecting program includes:
      a call detecting program for detecting a call from a remote requesting device and for establishing a connection with the remote requesting device; and
      a request detecting program for detecting the remote target device specifying data transmitted from the remote requesting device through the established connection;
   wherein the request detecting program includes program for disconnecting the connection with the remote requesting device after the remote target device specifying data is detected; and
   wherein the transmitting program includes a program for transmitting a call signal for calling the remote target device so that a new connection will be established with the remote target device, the information being transmitted to the remote target device through the new established connection.

* * * * *